Jan. 25, 1944. A. Y. DODGE 2,340,113
MASTER CYLINDER AND PISTON CONSTRUCTION
Filed Oct. 17, 1941
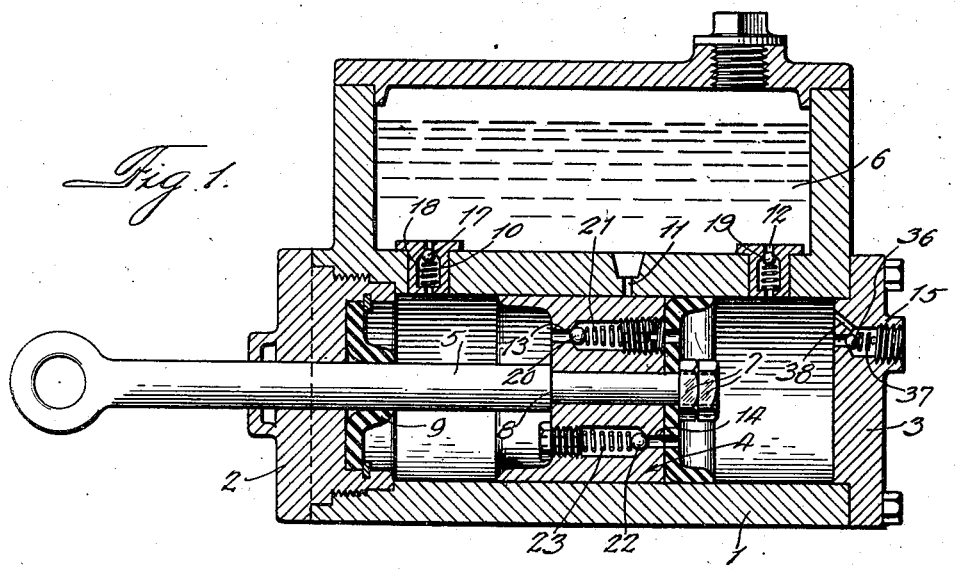
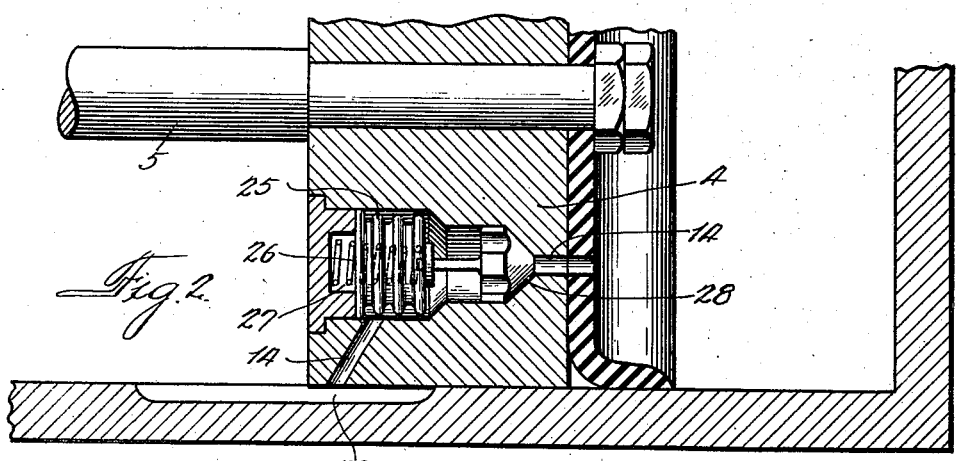
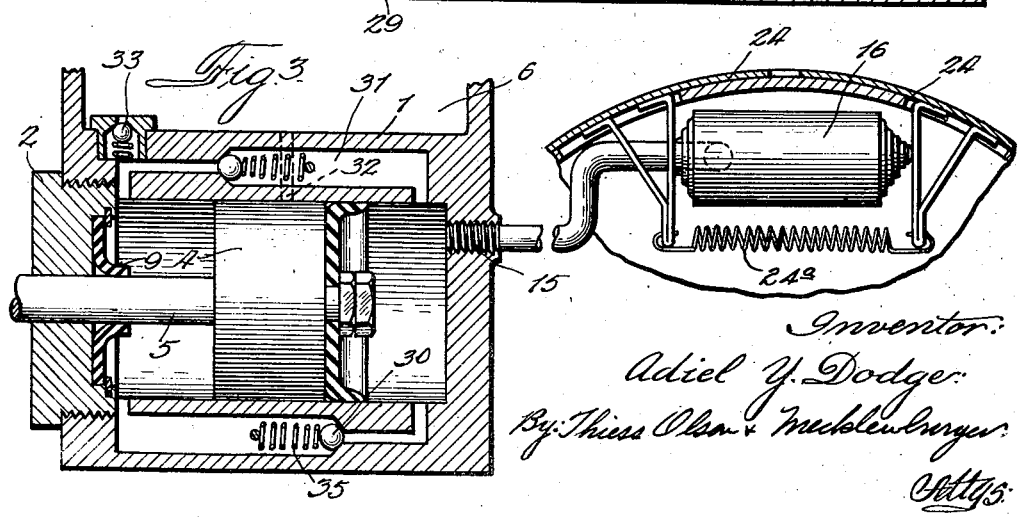
Inventor:
Adiel Y. Dodge
By: Thiess Olson & Mecklenburger
Attys.

Patented Jan. 25, 1944

2,340,113

UNITED STATES PATENT OFFICE 2,340,113

MASTER CYLINDER AND PISTON CONSTRUCTION

Adiel Y. Dodge, Rockford, Ill.

Application October 17, 1941, Serial No. 415,442

3 Claims. (Cl. 60—54.6)

My invention relates to a master cylinder and piston construction.

One of the objects of my invention is to provide an improved construction for use in supplying fluid to a pressure actuated actuator to which a varying resistance is opposed, in which, during a relatively low resistance period, fluid will be supplied to the actuator at a greater rate in proportion to the movement of the master piston than during a relatively high resistance period.

A further object of my invention is to provide an improved brake-applying master cylinder and piston construction which will cause a quick take-up of the slack in the brake.

A further object of my invention is to provide such a construction in which the transition from the quick take-up to the subsequent forceful brake application may be accomplished without any sudden change in the pedal pressure which might disturb the driver.

A further object of my invention is to provide such a construction in which the quick take-up of slack may be accomplished without causing a material reduction in the subsequent forceful brake application and in which the force required in the quick take-up of slack shall not be added to the force required in the subsequent forceful brake application.

A further object of my invention is to provide such a construction in which at some stage in the movement of the piston the relatively greater flow of fluid to the actuator will be resumed regardless of the resistance opposing movement of the actuator.

A further object of my invention is to provide such a construction in which the change from relatively rapid flow to relatively slow flow is controlled by the difference in pressure on opposite sides of the piston.

A further object of my invention is to provide such a construction in which an initial relatively high pressure differential is required to change the flow from relatively rapid flow to relatively slow flow but in which after the slow flow rate has been established, a lower pressure differential on opposite sides of the piston will maintain the relatively slow flow.

A further object of my invention is to provide an improved construction in which the change from relatively rapid flow to relatively slow flow is accomplished in a definite manner without pulsations.

A further object is to provide an improved construction in which the movement of the piston may be utilized to exert a pumping action to keep the system full of liquid.

Further objects and advantages of the invention will be apparent from the description and claims.

In the drawing, in which several forms of my invention are shown,

Figure 1 is an axial sectional view through a cylinder and piston construction;

Fig. 2 is an enlarged view showing a different form of pressure-opened valve construction; and Fig. 3 is an axial sectional view showing a different arrangement of valves and passages.

Referring to the drawing in detail, and first to Fig. 1, the construction shown here comprises a cylinder 1 having detachable cylinder heads 2 and 3, a piston 4 operating in said cylinder, a piston rod 5 secured to said piston, and an oil reservoir 6 in communication with the cylinder which normally contains a supply of oil under atmospheric pressure. The piston 4 is secured to the piston rod 5 by means of nuts 7 threaded on the reduced portion of the piston rod and holding the piston against the shoulder 8 on the piston rod. A packing 9 is provided between the piston rod and the cylinder head 2.

In the construction shown there are three passages 10, 11, and 12 which may enable flow between the reservoir and the cylinder, and two passages 13 and 14 which may enable flow between the opposite sides of the piston 4. An opening 15 is provided in the cylinder head 3 through which fluid may be supplied to a pressure-actuated actuator 16 such as indicated in Fig. 3. The passage 10 is controlled by a check valve 17 pressed by a light spring 18 against its seat and enabling flow between the reservoir 6 and the piston rod side of the piston but preventing return flow. The passage 12 is controlled by check valve 19 which enables flow from the reservoir 6 into the chamber on the right-hand side of the piston but prevents return flow. The passage 11 is controlled by the piston itself, being uncovered to permit communication between the reservoir 6 and the cylinder when the piston is in its extreme left-hand position but being covered at all other positions. The passage 13 from one side to the other of the piston is controlled by a check valve 20 pressed lightly against its seat by means of a coil compression spring 21 which enables flow from the piston rod side of the piston to the other side but prevents return flow. The passage 14 through the piston is controlled by a spring-pressed check valve 22 which allows flow from the right-hand side of the piston to the piston rod side of the piston when the pressure differential on opposite sides of the piston becomes great enough to overcome the resisting pressure of the coil compression spring 23.

Force may be applied to the piston rod to move it to the right by any suitable mechanism, such as a pedal. The fluid pressure actuator 16 may be used, for example, for applying the brake band 24 of an automobile, the brakes being such that little resistance is opposed to movement of the actuator during the first part of the movement of the piston rod, this part of the movement being applied to taking up the slack in the brakes. After the slack is taken up, the actuator will meet with increased resistance requiring greater fluid pressure to continue the application of the brakes.

In use, assuming that the piston 4 is in its extreme left-hand position and that the chamber on the right-hand side of the piston is full of fluid, initial movement of the piston will close the passage 11 so that further movement will force fluid out of the chamber on the right-hand side of the piston into the fluid pressure actuator 16. Fluid will flow into the chamber on the left-hand side of the piston from the reservoir 6 past the lightly-held check valve 17. The pressure on the fluid on the left-hand side of the piston will be substantially atmospheric. Pressure on the right-hand side will be determined by the resistance to the movement of the fluid pressure actuator 16. When this resistance increases to an extent which will cause the fluid pressure acting on the spring-pressed valve 22 to open, a pressure differential will be established between the chamber on the right-hand side of the piston and the chamber on the piston rod side of the piston which will build up a pressure on the chamber on the left-hand side of the piston tending to move the piston to the right. The pressure in the chamber on the left-hand side of the cylinder will keep the check valve 17 closed so that no more fluid will be supplied to the left-hand chamber from the reservoir. The pressure on the right-hand side will of course keep the check valve 19 closed to prevent fluid from backing up into the reservoir. Continued movement of the piston to the right will cause a flow of fluid from the right-hand side of the piston to the left-hand side through the port 14 in an amount sufficient to keep the chamber on the left-hand side full. However, a relatively small amount of fluid will still be forced out through the opening to the fluid pressure actuator, due to the displacement effected by the piston rod. For a given movement of the piston to the right, the decrease in size of the chamber on the right-hand side of the piston is greater than the increase in size of the chamber on the left-hand side of the piston, since the change in volume on the right-hand side is proportional to the total cross-sectional area of the piston, whereas the change in volume on the left-hand side of the piston is proportional to the cross-sectional area of the piston minus the cross-sectional area of the piston rod. The result of this will be that when communication is established between the chambers on opposite sides of the piston, the amount of fluid forced out from the right-hand chamber into the fluid pressure actuator will be much less for a given movement of the piston rod than it was prior to the establishment of communication between the opposite sides of the piston. This enables a relatively great movement of the piston rod for a given movement of the fluid pressure actuator with a consequent increase in the force which will be exerted by the fluid pressure actuator. The pressure conditions under which the valve 22 will be unseated may be determined by the design of the spring which opposes the opening of this valve.

It is customary to provide a spring 24a for relieving the brakes and a spring for returning the piston rod. A spring which might be used for returning the piston rod is shown in my Patent No. 2,263,263, dated November 18, 1941. The piston 4 may be moved to the right sufficiently to cause the actuator 16 to move to an extent to apply the brakes with the desired pressure. To release the brakes, the pedal may be released to allow a brake pedal return spring to pull the piston 4 to the left, the brake-releasing spring also acting at the same time to release the brakes and cause the actuator 16 to return the fluid to the master cylinder. During this return movement, the check valves 17 and 19 will be closed by fluid pressure and the check valve 20 will be opened by fluid pressure to enable the fluid to escape from the chamber on the piston rod side of the piston into the right-hand chamber past the lightly pressed check valve 20. However, the decrease in volume of the chamber on the piston rod side of the piston for a given movement of the piston will not be as great as the increase in volume of the right-hand chamber, due to the displacement action of the piston rod, and hence additional fluid will have to be supplied to the chamber on the right-hand side of the piston. This fluid will be supplied mainly by the return of the actuator 16 which will force fluid back into this right-hand chamber because of the action of the actuator-returning spring. If, however, for any cause, such as sluggish action of the brake-releasing spring, the amount of fluid returned through the passage 15 is insufficient to maintain the right-hand chamber full of fluid, additional fluid necessary to keep the right-hand chamber full will be supplied from the reservoir 6 past the lightly pressed spring check valve 19. If, when the piston has moved to its extreme left-hand position so as to open the passage 11 from the chamber on the right-hand side of the piston to the reservoir, the fluid has not been expelled from the fluid pressure actuator sufficiently to allow the complete release of the brake, the excess fluid in the brake actuator may be expelled through the passage 11 into the reservoir.

It will be noted that in this construction a certain pressure differential on the opposite sides of the piston must be reached and maintained in order to keep the valve open and enable the slow powerful action of the brake actuator. In Fig. 2 I have shown a different form of valve construction for controlling the action of the valve which controls the flow between the chambers on opposite sides of the piston. In this form a pressure-controlled bellows 25 is provided which is subjected to the fluid pressure in the passageway 14 leading from one side of the piston to the other. In the construction shown, this pressure-actuated device is a Sylphon type bellows which encloses the valve-closing spring 26 and which is hermetically sealed so that its position is controlled by the spring 26 and by the pressure differential between the chamber 27 enclosed by the bellows and the outside pressure. With this construction it will be seen that when the pressure differential on opposite sides of the piston 4 has become great enough to force the valve 28 open, the resultant increase in fluid pressure on the outside of the Sylphon bellows 25 will tend to collapse the bellows against the inside pressure and against the spring action so that once the valve has been opened a relatively light pressure will maintain the valve open. With this construction less resistance to movement of the piston results than in the construction shown in Fig. 1 in which a definite pressure differential on opposite sides of the piston 4 has to be maintained in order to open the valve 22 and keep it open.

In Fig. 2 is shown a device whereby a final quick brake-applying action is obtained. This is accomplished by the provision of the groove 29 in the wall of the cylinder which registers with the passage 14 in the piston during the greater part of the movement of the piston but which is closed during the final movement of the piston so that thereafter there can be no more flow through the passage 14 from the right-hand side of the piston to the left-hand side and so that thereafter movement of the piston will result in a relatively rapid discharge of fluid from the master cylinder into the fluid pressure actuator 16 and a consequent rapid movement of the brake-applying actuator. This device is in the nature of an emergency device which will insure some application of the brakes regardless of the failure of the first part of the movement of the piston to apply the brakes properly. The remainder of the construction of Fig. 2 may be the same as in Fig. 1.

It will be noted in this construction, as well as in the other constructions described, that the transition from quick take-up action to subsequent forceful brake application is accomplished without any sudden change in the pedal pressure since the change in pressure will be relatively gradual as fluid passing the valve 28 must flow by the resistance of the valve and through the passages 14 to the opposite side of the piston. The resistance of the valve 28 and the frictional resistance in the passages 14 will bring about a relatively shockless change in pressure.

In Fig. 3 is shown a construction in which the spring-pressed valve 30 which controls communication between the chamber on the right-hand side of the piston and the left-hand side of the piston is in the wall of the cylinder 1 itself, instead of through the piston, as shown in Figs. 1 and 2, and in which the passage 31, which enables return flow of the fluid from the chamber on the left-hand side of the piston to the chamber on the right-hand side of the piston during the return movement of the piston is in the cylinder wall itself instead of through the piston. The passage 32 connecting the reservoir 6 and cylinder 1 is uncovered by the piston 4 in its extreme left-hand position and corresponds to the passage 11 shown in Fig. 1. The check valve 33 controlling the passage between the reservoir 6 and the cylinder enables flow from the reservoir into the cylinder on the right-hand movement of the piston but prevents return flow from the cylinder into the reservoir on the left-hand movement of the piston. This check valve 33 corresponds to the check valve 17 shown in Fig. 1. In Fig. 3 no check valve corresponding to the check valve 19 shown in Fig. 1 is provided, as this is a refinement which may be dispensed with under certain conditions. The check valve 34 corresponds to the check valve 20 of Fig. 1, enabling fluid to pass around the piston 4 on its return stroke. The action of the spring 35 shown in Fig. 3 is substantially the same as that of the spring 23 described in connection with Fig. 1. As the piston is moved toward the right, a stage will be reached in which the pressure on the right-hand side of the piston will increase sufficiently to force the valve 30 open against the action of the spring 35, after which fluid can flow from the right-hand side of the piston to the left-hand side of the piston, with the same results and advantages as described in connection with Fig. 1; that is to say, a relatively rapid initial movement of the brake-applying actuator followed by relatively slow powerful application when the resistance causes the fluid pressure to become great enough to open the spring-pressed valve 30.

In the construction shown in Fig. 3 when the piston 4 closes the passage leading to the valve 30, further movement of the piston 4 will cause a relatively high speed movement of the actuator 16, as no fluid can then escape from one side of the piston 4 to the other. It is obvious that the valve construction 25, 26, 27, and 28 of Fig. 2 might be substituted for the valve construction 30 and 35 of Fig. 3.

Referring again to Figure 1, in order to make sure that the movement of the piston 4 may be utilized to exert a pumping action to keep the system full of liquid, a check valve arrangement may be provided which will enable relatively free flow from the master cylinder to the actuator 16 but which will restrict the return flow so that a quick return movement of the piston will demand more liquid than can be returned from the actuator, so that the deficiency will be supplied from the reservoir 6 past the check valve 19. The construction shown for this purpose comprises a check valve 36 pressed toward its seat by a light spring 37 and a restricted by-pass 38 for the return flow from the actuator to the master cylinder. With this construction on the right-hand movement of the piston, the valve 36 will open and allow relatively free flow from the cylinder to the actuator. However, on the return stroke of the piston, the valve 36 will seat and the return flow will have to be through the restricted by-pass 38. If the piston is allowed to return rapidly, the increase in volume of the chamber on the right-hand side of the piston may be so rapid that liquid will have to be supplied to this chamber from the reservoir 6. After the piston has been returned to its extreme left-hand position any more liquid which may be forced from the actuator 16 into the right-hand cylinder chamber will cause a corresponding amount of fluid to be forced out through the passage 11 into the reservoir 6.

Further modifications will be apparent to those skilled in the art and it is desired, therefore, that the invention be limited only by the scope of the appended claims.

Having thus described my invention, what I claim and desire to secure by Letters Patent is:

1. A master cylinder and piston construction comprising a cylinder, a piston rod and a piston secured to said rod and held securely against axial movement with respect thereto, said cylinder having a port through which fluid is forced to a pressure-actuated actuator to which a varying resistance is opposed, said construction having a passage between the chamber on the piston rod side of the piston to the chamber on the other side of the piston, a one-way pressure opened valve in said passage opened by the rise in pressure in the chamber on said other side of said piston during one stage of movement of said piston and a cut-off rendered effective during a later stage of movement of said piston for closing said passage to effect relatively high speed actuator movement.

2. A master cylinder and piston construction comprising a cylinder, a piston rod and a piston secured to said rod and held securely against axial movement with respect thereto, said cylinder having a port through which fluid is forced to a pressure-actuated actuator to which a varying resistance is opposed, said construction having a passage between the chamber on the piston rod side of the piston to the chamber on the other side of the piston, a spring closed valve in said passage opened by the rise in pressure in the chamber on said other side of said piston, and a pressure-actuated device opposing the spring closure action, the pressure on which device is controlled by the opening and closing of said valve, said pressure actuated device comprising a bellows daiphragm, spring-biased to oppose the valve opening movement and subject to the pressure on the low pressure side of the valve.

3. A master cylinder and piston construction comprising a cylinder, a piston rod and a piston secured to said rod and held securely against axial movement with respect thereto, said cylinder having a port through which fluid is forced to a pressure-actuated actuator to which a varying resistance is opposed, said construction having a passage between the chamber on the piston rod side of the piston to the chamber on the other side of the piston, a spring-closed valve in said passage opened by the rise in pressure in the chamber on said other side of said piston, and a fluid flow control device for closing the flow through said passage during the latter part of the inward movement of the piston rod.

ADIEL Y. DODGE.